United States Patent
Hagan et al.

(10) Patent No.: US 9,957,820 B2
(45) Date of Patent: May 1, 2018

(54) HEAT SHIELD FOR A VANE ASSEMBLY OF A GAS TURBINE ENGINE

(71) Applicant: UNITED TECHNOLOGIES CORPORATION, Hartford, CT (US)

(72) Inventors: Benjamin F. Hagan, Manchester, CT (US); Ryan Alan Waite, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 332 days.

(21) Appl. No.: 14/728,723

(22) Filed: Jun. 2, 2015

(65) Prior Publication Data

US 2016/0356177 A1 Dec. 8, 2016

(51) Int. Cl.
*F01D 9/02* (2006.01)
*F01D 5/18* (2006.01)

(52) U.S. Cl.
CPC .............. *F01D 9/02* (2013.01); *F01D 5/188* (2013.01); *F01D 5/189* (2013.01); *F01D 9/023* (2013.01); *F05D 2220/32* (2013.01); *F05D 2240/121* (2013.01); *F05D 2240/15* (2013.01); *Y02T 50/676* (2013.01)

(58) Field of Classification Search
CPC . F01D 9/02; F01D 9/023; F01D 5/189; F05D 2240/15; F05D 2240/121; F05D 2220/32; Y02T 50/676
See application file for complete search history.

(56) References Cited

U.S. PATENT DOCUMENTS

| | | | | |
|---|---|---|---|---|
| 3,767,322 A | * | 10/1973 | Durgin | F01D 9/042 415/115 |
| 4,288,201 A | * | 9/1981 | Wilson | F01D 5/189 415/115 |
| 8,162,594 B2 | * | 4/2012 | Guimbard | F01D 5/189 415/115 |

OTHER PUBLICATIONS

Extended European Search Report dated Oct. 17, 2016 in European Application No. 16163184.1.

* cited by examiner

*Primary Examiner* — Igor Kershteyn
*Assistant Examiner* — Brian P Wolcott
(74) *Attorney, Agent, or Firm* — Snell & Wilmer, L.L.P.

(57) ABSTRACT

A heat shield is provided for use in an inner cavity of a gas turbine engine component. The heat shield comprises a heat shield body comprising opposed side portions defining an inner channel. An inner section of a side portion of the opposed side portions is inwardly sloped such that a cross-section of the heat shield body is smaller in an inner body portion relative to a cross-section of an outer body portion thereof. An aperture is disposed through the side portion in a selected radial position. A vane assembly including the heat shield is also provided.

17 Claims, 5 Drawing Sheets

HEAT SHIELD FOR A VANE ASSEMBLY OF A GAS TURBINE ENGINE

GOVERNMENT LICENSE RIGHTS

This disclosure was made with government support under FA 8650-09-D-2923-0021 awarded by The United States Air Force. The government has certain rights in the disclosure.

FIELD

The present disclosure relates generally to heat shielding systems for gas turbine engines and, more particularly, to a heat shield for a vane assembly of a gas turbine engine.

BACKGROUND

Gas turbine engines include a turbine section having multiple rows of vanes and multiple rows of blades that can rotate about an axis with respect to the vanes. The turbine section receives exhaust from a combustor section. The velocity of the exhaust causes the turbine blades to rotate about the axis, creating torque. The torque is transferred to a fan section and/or a compressor section of the gas turbine engine where the torque is applied to the fan and/or compressor blades. The turbine blades and vanes are subject to relatively high temperatures. Accordingly, compressed air from the compressor section is channeled to the turbine section where it can be directed through the turbine vanes and blades and cool the turbine blades and vanes. Turbine blades and vanes include an airfoil having leading and trailing edges, pressure and suction sides, and a root and a tip. The airfoil may include an inner cavity for receiving the compressed air. The interior cavity may have an open end at an outer diameter of the blade or vane.

SUMMARY

A heat shield is provided for use in an inner cavity of a gas turbine engine component, in accordance with various embodiments. The heat shield comprises a heat shield body comprising opposed side portions defining an inner channel and an aperture disposed through the side portion in a selected radial position. An inner radial section of a side portion of the opposed side portions is inwardly sloped such that a cross-section of the heat shield body is smaller in an inner body portion relative to a cross-section of an outer body portion thereof.

A gas turbine engine is provided in accordance with various embodiments. The gas turbine engine comprises a component having an inner wall defining an inner cavity for receiving a main cooling flow, a heat shield disposed within the inner cavity. The inner wall comprises a first inner wall portion configured to be colder than a second inner wall portion. The heat shield is configured with an overall shape that generally conforms to a contour of the inner cavity. The heat shield comprises a heat shield body having opposed side portions defining an inner channel and an aperture disposed through a side portion of the opposed side portions opposite the first inner wall portion. The heat shield body defines an outer channel between the opposed side portions and the inner wall.

A vane assembly for a gas turbine engine is provided in accordance with various embodiments. The vane assembly comprises a vane having an inner wall defining an inner cavity and a heat shield disposed in and having a shape generally conforming to a contour of the inner cavity. The inner wall comprises a first inner wall portion and a second inner wall portion. The first inner wall portion is configured to be colder than the second inner wall portion. The heat shield comprises a heat shield body comprising opposed side portions defining an inner channel for receiving a main cooling flow and an aperture disposed in a selected radial position through the side portion opposite the first inner wall portion. The heat shield body defines an outer channel between the opposed side portions and the inner wall of the vane. A cross-section of the heat shield body is reduced in an inner body portion relative to an outer body portion thereof.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
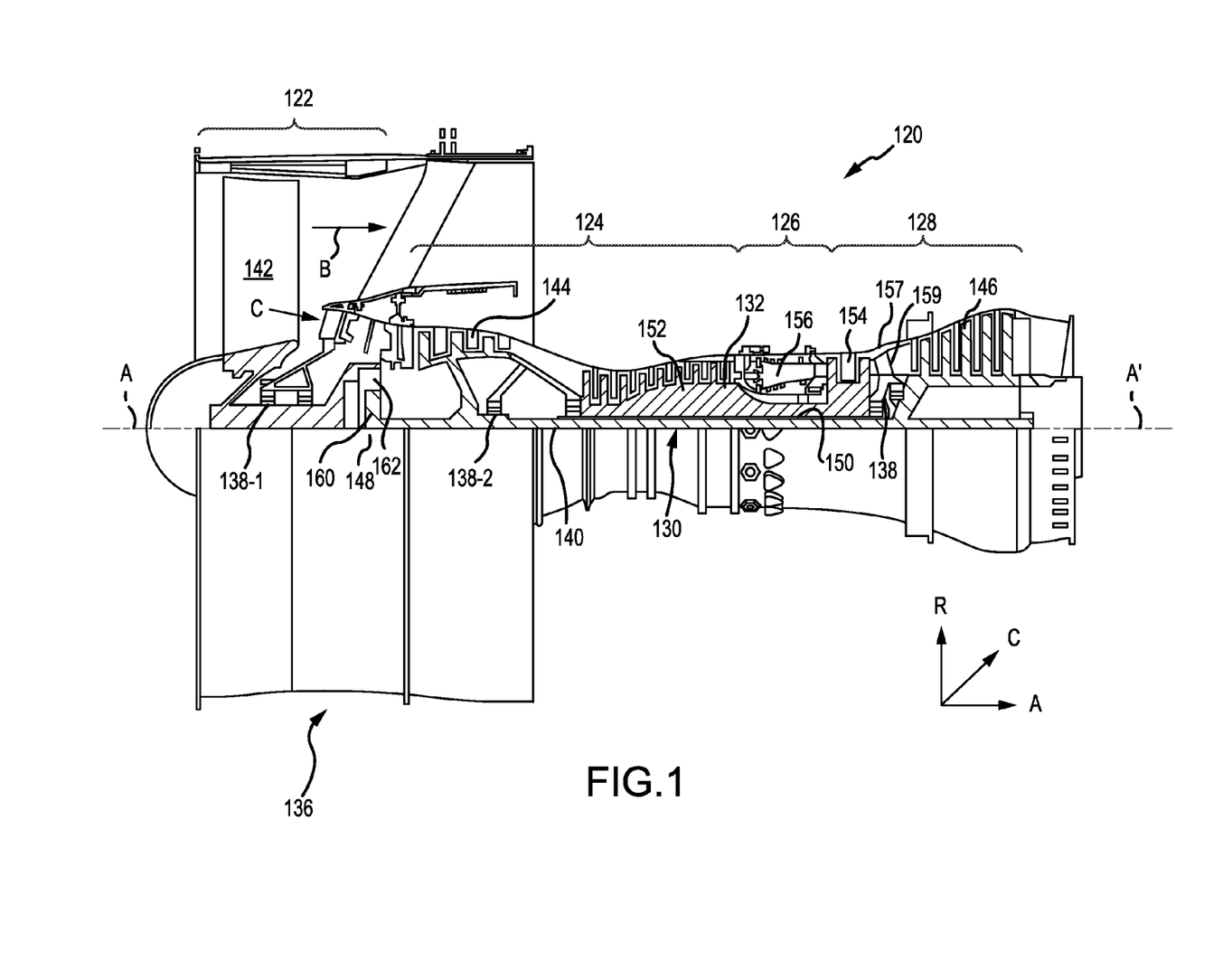
FIG. 1 is a cross-sectional view of an exemplary gas turbine engine, in accordance with various embodiments.
Figure 2:
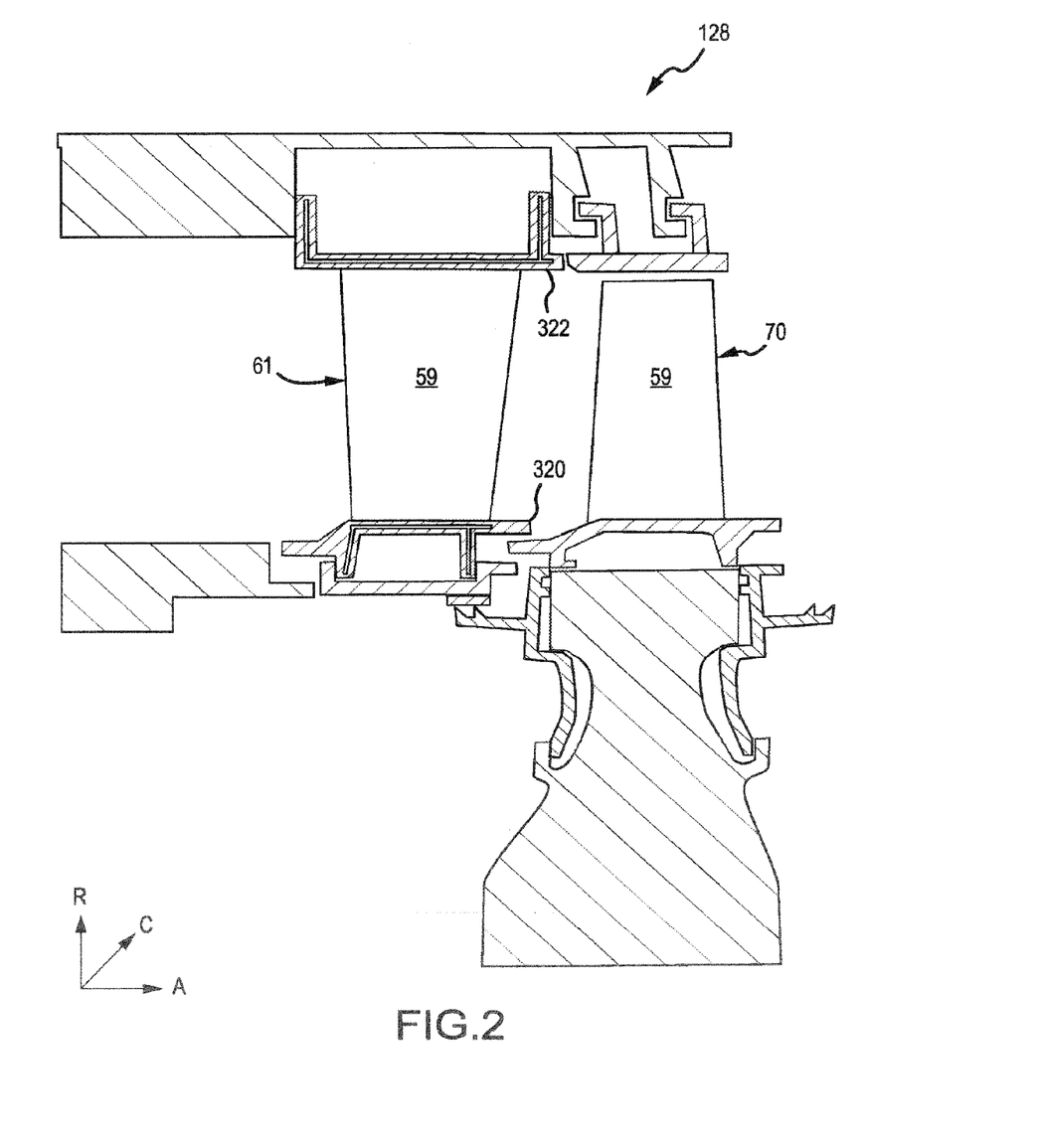
FIG. 2 illustrates a portion of a high pressure turbine section of the gas turbine engine of FIG. 1 including a turbine vane and a turbine blade, in accordance with various embodiments.

With reference to FIGS. 1 and 2, a gas turbine engine 120 is provided. An A-R-C axis illustrated in each of the figures illustrates the axial (A), radial (R) and circumferential (C) directions. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the positive R direction.

Gas turbine engine 120 may be a two-spool turbofan that generally incorporates a fan section 122, a compressor section 124, a combustor section 126 and a turbine section 128. Alternative engines include an augmentor section among other systems or features. In operation, fan section 122 drives air along a bypass flow-path B while compressor section 124 drives air along a core flow-path C for compression and communication into combustor section 126 then expansion through turbine section 128. Although depicted as a turbofan gas turbine engine 120 herein, it should be understood that the concepts described herein are not limited to use with turbofans as the teachings may be applied to other types of turbine engines including three-spool architectures.

Gas turbine engine 120 generally comprise a low speed spool 130 and a high speed spool 132 mounted for rotation about an engine central longitudinal axis A-A' relative to an engine static structure 136 via several bearing systems 138, 138-1, and 138-2. It should be understood that various bearing systems 138 at various locations may alternatively or additionally be provided, including for example, bearing system 138, bearing system 138-1, and bearing system 138-2.

Low speed spool 130 generally includes an inner shaft 140 that interconnects a fan 142, a low pressure (or first) compressor 144 and a low pressure (or first) turbine 146. Inner shaft 140 is connected to fan 142 through a geared architecture 148 that can drive fan 142 at a lower speed than low speed spool 130. Geared architecture 148 includes a gear assembly 160 enclosed within a gear housing 162. Gear assembly 160 couples inner shaft 140 to a rotating fan structure. High speed spool 132 includes an outer shaft 150 that interconnects a high pressure (or second) compressor 152 and high pressure (or second) turbine 154. A combustor 156 is located between high pressure compressor 152 and high pressure turbine 154. A mid-turbine frame 157 of engine static structure 136 is located generally between high pressure turbine 154 and low pressure turbine 146. Mid-turbine frame 157 supports one or more bearing systems 138 in turbine section 128. Inner shaft 140 and outer shaft 150 are concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 144 then high pressure compressor 152, mixed and burned with fuel in combustor 156, then expanded over high pressure turbine 154 and low pressure turbine 146. Mid-turbine frame 157 includes airfoils 159 which are in the core airflow path. Turbines 146, 154 rotationally drive the respective low speed spool 130 and high speed spool 132 in response to the expansion.

Gas turbine engine 120 is a high-bypass ratio geared aircraft engine. The bypass ratio of gas turbine engine 120 may be greater than about six (6). The bypass ratio of gas turbine engine 120 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly greater than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

Turbine section 128 may include a plurality of vanes, such as vane 61, and a plurality of blades, such as blade 70 as illustrated in FIG. 2. The vane 61 has an airfoil 59 extending between spaced apart inner and outer endwalls 320 and 322. Vane 61 may be subject to relatively high temperatures due to contact with hot exhaust gases, which in turn increase the internal temperatures of vane 61. The relatively high temperatures may be within the range of temperatures typically observed in turbine section 128.

Figure 3:
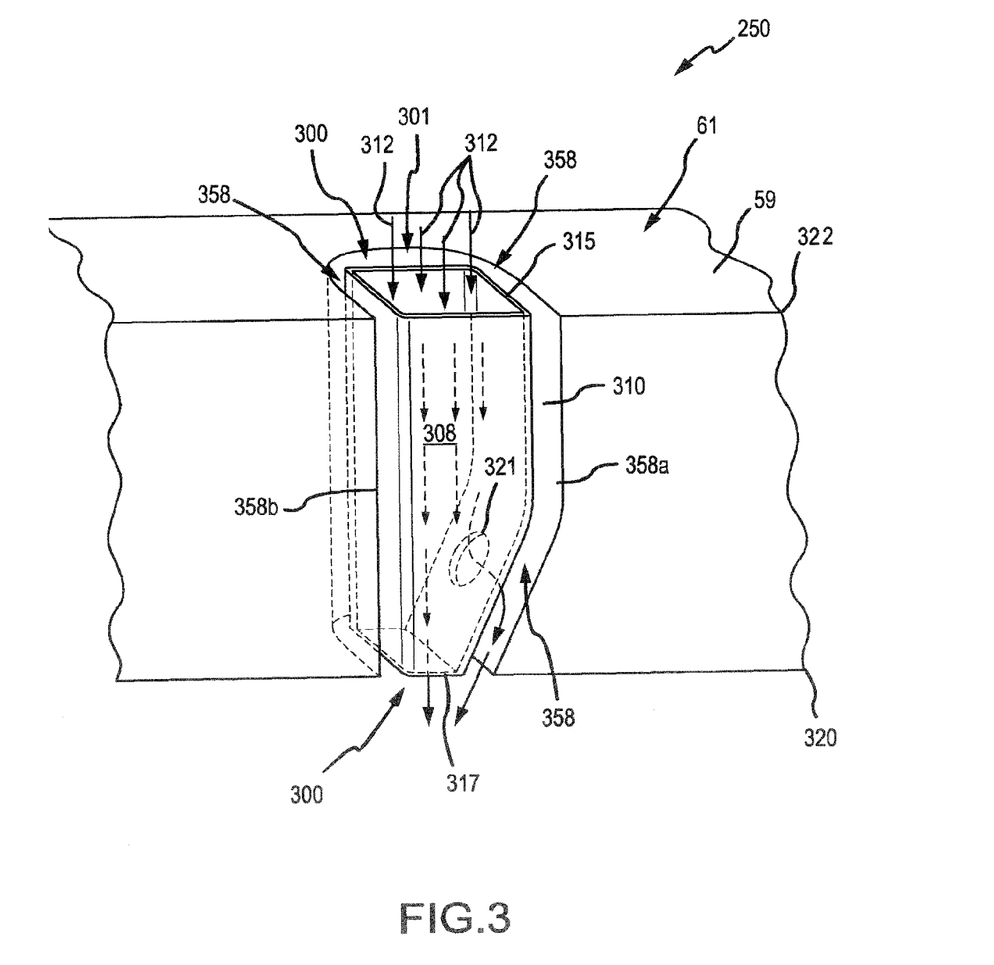
FIG. 3 illustrates a portion of a vane assembly including a heat shield disposed in an inner cavity of the vane (more particularly, in the airfoil portion of the vane) of FIG. 2, in accordance with various embodiments.
Figure 4:
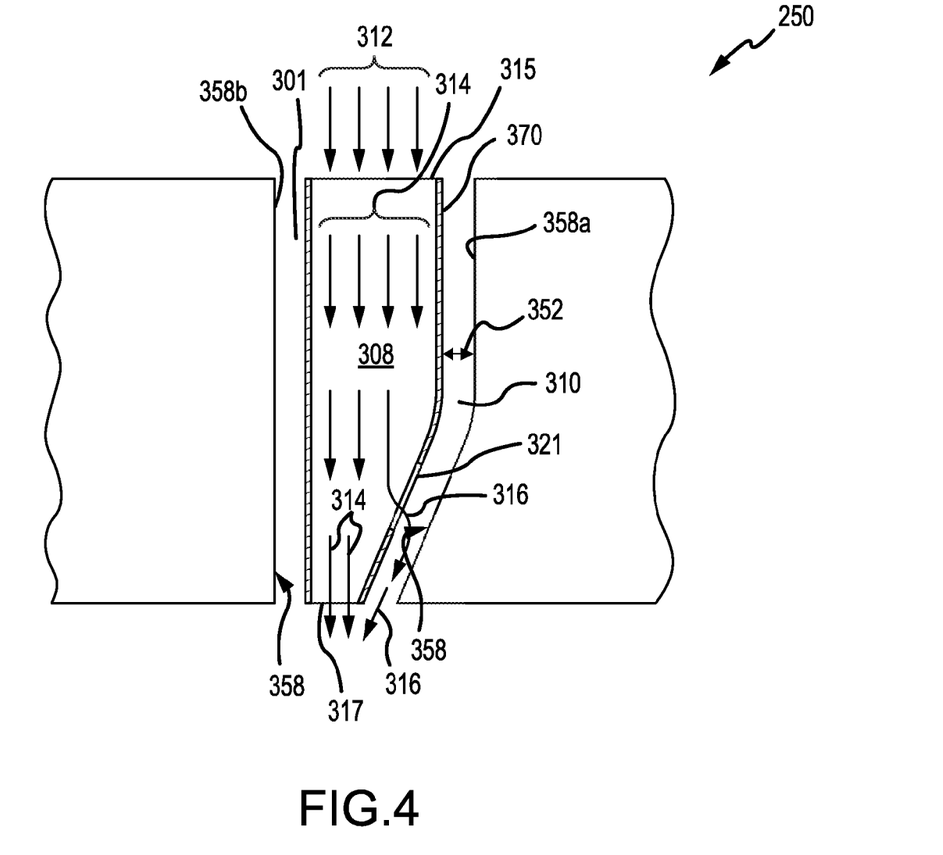
FIG. 4 illustrates a partial view of the vane assembly of FIG. 3, in accordance with various embodiments.

Vane 61 and/or blade 70 may receive compressed air from compressor section 124 and/or other components of turbine section 128. With reference now to FIGS. 3 and 4, an inner wall 358 of vane 61 may define an inner cavity 301 of airfoil 59 that receives air from compressor section 124 and/or other components of gas turbine engine 120 (hereinafter "main cooling flow" as illustrated by arrows 312 in FIGS. 3 and 4). The inner wall comprises a first inner wall portion 358a and a second inner wall portion 358b. The first inner wall portion is configured to be colder than the second inner wall portion. The air received by inner cavity 301 may have a lower temperature than ambient air within high pressure turbine 154. Accordingly, this received air can be used to cool vane 61. In various embodiments, the air within the cavity of vane 61 may be distributed throughout vane 61 such that it contacts one or more inner surfaces of vane 61, reducing the temperature of vane 61. In various embodiments, a portion of the air received by inner cavity 301 may be distributed to other components of turbine section 128 and can flow through defined channels for cooling components other than vane 61. With continued reference to FIGS. 3 and 4, inner cavity 301 of airfoil 59 may receive the main cooling flow, illustrated by arrows 312, as noted above. The cooling flow may flow radially inward from the outer endwall 322 toward the inner endwall 320. In various embodiments, the cooling flow may instead flow radially outward, axially forward, axially aft or any other direction.

Due to the high temperatures of the exhaust and vane 61, a heat shield 300 may be used to insulate the main cooling flow as it flows through the hot vane. Accordingly, it is desirable for the material of heat shield 300 to be resistant to heat such that the material retains its tensile strength in response to being subjected to these relatively high temperatures. In that regard and in various embodiments, heat shield 300 may include one or more of a nickel, a nickel alloy, cobalt, a cobalt alloy, or other metals that are resistant to heat. The heat shield 300 may be manufactured using formed sheet metal, investment casting, die casting, additive manufacturing, machining or the like. In various embodiments, heat shield may be formed using a single die.

Figure 5:
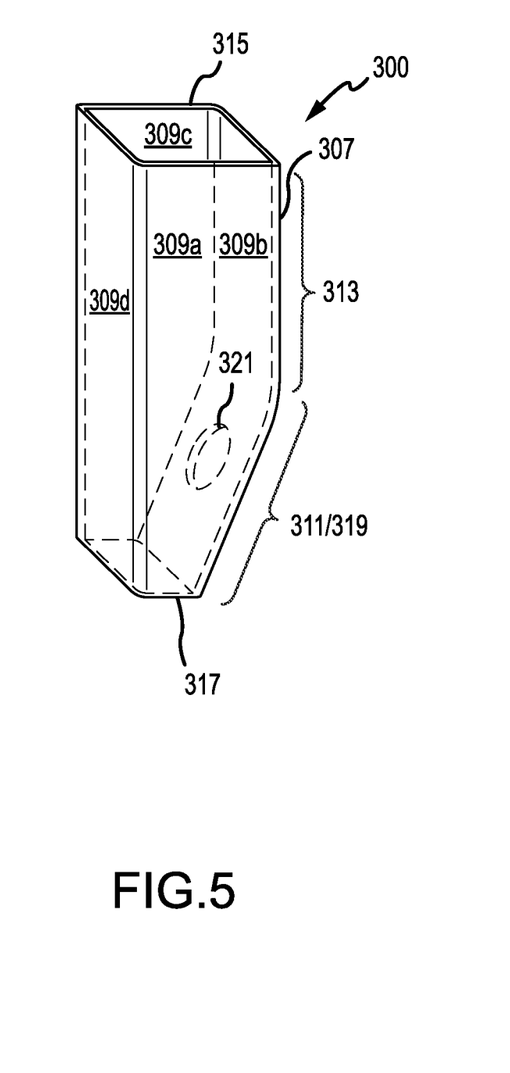
FIG. 5 illustrates a perspective view of the heat shield of FIGS. 3 and 4, in accordance with various embodiments.

In accordance with various embodiments, a vane assembly 250 (FIGS. 3 and 4) for the gas turbine engine comprises the vane 61 including the airfoil 59 defining the inner cavity 301 that receives the main cooling flow and the heat shield 300 disposed in the inner cavity 301. Still referring to FIGS. 3 and 4 and now to FIG. 5, in accordance with various embodiments, heat shield 300 comprises a heat shield body 307 comprising opposed side portions 309a through 309d defining an inner channel 308 for receiving the main cooling flow. As illustrated, inner channel 308 is defined axially and circumferentially within heat shield body 307. Heat shield 300 (more particularly, heat shield body 307) is disposed within the inner cavity 301 of vane 61 (more particularly, the airfoil 59 of vane 61) in the radial direction. The heat shield body may extend radially through the entire airfoil. The heat shield 300 (and the heat shield body 307) is configured with an overall shape that generally conforms to one or more contours of the inner cavity of the airfoil 59 of the vane 61. Heat shield 300 is illustrated as having a generally elongated heat shield body. In various embodiments, heat shield can be designed having any suitable shape. The heat shield may be a unitary structure (a "peripheral wall") with unitary side portions or separate sides (referred to herein as "side portions"). It is also to be understood that the term "side" as used hereinafter may refer to a non-planar surface. While four side portions 309a through 309d are illustrated, it is to be understood that the heat shield body 307 may comprise fewer or greater number of side portions.

Due to complexity in airfoil geometry and the need to insert the heat shield into the vane through an opening in either the inner or outer platform, the cross-section of the heat shield body 307 is reduced in an inner body portion 311 relative to an outer body portion 313. The "inner body portion" refers to the portion of the heat shield body 307 that is nearer the inner endwall 320 and the "outer body portion" refers to the portion of the heat shield body nearer the outer endwall 322. The outer body portion 313 has a first open end 315 and the inner body portion 311 has an opposing second open end 317 with a reduced cross-section relative to a cross-section of the first open end 315. The first open end 315 comprises a heat shield inlet and the second open end 317 comprises a heat shield outlet. An inner section (the portion of the side portion proximate the inner endwall 320) 319 of a side portion (in the depicted embodiment, side portion 309b) of the opposed side portions may be inwardly sloped to define the reduced cross-section inner body portion 311 of the heat shield body. As used herein, the term "inwardly sloped" refers to the inner section being sloped in an axial direction toward an opposite side portion, over a radial distance. The reduced cross-section inner body portion may be defined in other manners in accordance with exemplary embodiments. While the cross-sections of the heat shield body are illustrated as rectangular, it is to be understood that other cross-sectional shapes may be used for the heat shield body. For example, other cross-sectional shapes may include a circular cross-section or an oval cross-section.

An outer channel 310 may be defined between the heat shield body (more particularly, between an outer surface 370 of the opposed side portions 358) and the inner wall 358 of vane 61. Outer channel 310 is defined axially and circumferentially between heat shield body and the inner wall 358 of the vane 61. Outer surface 370 may be positioned a distance 352 from the inner wall 358. As noted previously, the inner wall 358 comprises a first inner wall portion 358a and a second inner wall portion 358b. The first inner wall portion 358a is configured to be colder than the second inner wall portion 358b (i.e., the first inner wall portion is configured to have more heat removed per unit area relative to the second inner wall portion).

In accordance with various embodiments, the heat shield 300 further comprises an aperture 321 disposed through the side portion 309b opposite the colder first inner wall portion 358a. The size and shape of aperture 321 may vary, but is typically larger than about 0.050 inches (about 1.27 millimeters) in diameter. The aperture 321 is disposed through the side portion in a selected radial position proximate the transition from the outer body portion 313 to the reduced cross section inner body portion 311 (more particularly, from the outer body portion 313 to the inwardly sloped inner section 319) of the side portion. As hereinafter described, the aperture 321 enables the outer channel 310 (more particularly, the portion of the outer channel defined between the outer surface 370 and the colder inner wall portion 358a) to receive a minority portion of the main cooling flow (hereinafter referred to as a "second cooling flow" as illustrated by arrows 316) to substantially prevent a flow restriction as the majority portion of the main cooling flow (hereinafter referred to as a "first cooling flow" as illustrated by arrows 314) exits through the reduced cross-sectional inner portion of the heat shield 300 and the vane, thereby helping to meet desired downstream flow rates.

Referring again to FIGS. 1 and 2, in various embodiments, heat shield 300 can be utilized in conjunction with blade 70 of turbine section 128. In various embodiments, low pressure turbine section 146 may include vanes similar to vane 61 capable of receiving compressed air from compressor section 124. The air may be used in a similar manner to cool the vanes and/or blades of low pressure turbine section 146. Thus, a heat shield similar to heat shield 300 may be used in the airfoils of low pressure turbine section 146. Similarly, airfoils in compressor section 124 may define inner cavities that receive and distribute a cooling flow and, thus, a heat shield similar to heat shield 300 may be used with a stator and/or rotor. In various embodiments, heat shield 300 may be used in other components of gas turbine engine 120.

In use, heat shield 300 may separate the main cooling flow received by inner cavity 301 into two or more separate flows. For example, heat shield 300 may split the main cooling flow 312 into a first cooling flow (arrows 314) received by the inner channel and a second cooling flow (arrows 316) received by the outer channel. The first and second cooling flows together substantially meet the downstream flow requirement.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A heat shield for use in an inner cavity of a gas turbine engine component, the heat shield comprising:
   a heat shield body comprising a first side portion and a second side portion opposed to the first side portion, the first side portion and second side portion defining an inner channel of the heat shield body, wherein an inner section of the first side portion comprises an inward slope such that a first cross-section of the heat shield body is smaller in an inner body portion of the heat shield body relative to a second cross-section of an outer body portion of the heat shield body, wherein the outer body portion has a first open end and the inner body portion has an opposing second open end, the second open end comprising a reduced cross-sectional size relative to a cross-sectional size of the first open end, the first open end comprising a heat shield inlet and the second open end comprising a heat shield outlet, wherein the first side portion and the second side portion extend from the heat shield inlet to the heat shield outlet; and
   an aperture disposed through the inner section of the first side portion in a selected radial position, wherein the selected radial position is proximate a transition from the outer body portion of the heat shield body to the inward slope of the inner section, and wherein the aperture is configured such that a minority portion of a cooling flow received at the heat shield inlet is separated from a majority portion of the cooling flow at the aperture, and wherein the second side portion of the heat shield is configured to substantially prevent the cooling flow from exiting the heat shield body through the second side portion.

2. The heat shield of claim 1, wherein the heat shield body has an overall shape configured to generally conform to a contour of the inner cavity.

3. The heat shield of claim 1, wherein the gas turbine engine component comprises a vane of a turbine section of a gas turbine engine.

4. A gas turbine engine comprising:
   a component having an inner wall defining an inner cavity for receiving a main cooling flow, the inner wall comprising a first inner wall portion configured to be colder than a second inner wall portion; and
   a heat shield disposed within the inner cavity, the heat shield configured with an overall shape that generally conforms to a contour of the inner cavity, the heat shield comprising:
     a heat shield body comprising a first side portion and a second side portion opposed to the first side portion, the first side portion and the second side portion defining an inner channel, the heat shield body defining an outer channel between the heat shield body and the inner wall, wherein an inner section of the first side portion of the heat shield body comprises an inward slope; and
     an aperture disposed through the inward slope of the inner section of the first side portion, wherein the aperture is oriented toward the first inner wall portion, and wherein the main cooling flow is separated into a first cooling flow and a second cooling flow at the aperture, and wherein the second side portion of the heat shield body is configured to substantially prevent the main cooling airflow from exiting the heat shield body through the second side portion, and wherein the second side portion is located proximate the second inner wall.

5. The gas turbine engine of claim 4, wherein a cross-section of the heat shield body is reduced in an inner body portion of the heat shield body relative to an outer body portion of the heat shield body.

6. The gas turbine engine of claim 5, wherein the outer body portion has a first open end and the inner body portion has an opposing second open end with a reduced cross-section relative to a cross-section of the first open end, the first open end comprising a heat shield inlet and the second open end comprising a heat shield outlet.

7. The gas turbine engine of claim 4, wherein a selected radial position of the aperture comprises a radial position proximate a transition to the inward slope of the inner section of the first side portion of the heat shield body.

8. The gas turbine engine of claim 4, wherein the component comprises a vane of a turbine section of the gas turbine engine.

9. The gas turbine engine of claim 6, wherein the first cooling flow is received by the inner channel and the second cooling flow is received by the outer channel, the second cooling flow comprising a minority portion of the main cooling flow.

10. The gas turbine engine of claim 9, wherein the aperture has a diameter greater than 0.050 inches (1.27 millimeters).

11. The gas turbine engine of claim 9, wherein the first cooling flow and the second cooling flow meet downstream of the heat shield outlet.

12. A vane assembly for a gas turbine engine, the vane assembly comprising:
- a vane having an inner wall defining an inner cavity, the inner wall comprising a first inner wall portion and a second inner wall portion, the first inner wall portion configured to be colder than the second inner wall portion; and
- a heat shield disposed in and having a shape generally conforming to a contour of the inner cavity, the heat shield comprising:
  - a heat shield body comprising a first side portion and a second side opposed to the first side portion, the first side portion and the second side portion defining an inner channel for receiving a main cooling flow, the heat shield body defining an outer channel between the heat shield body and the inner wall of the vane, wherein a cross-section of the heat shield body is reduced in an inner body portion of the heat shield body relative to an outer body portion of the heat shield body, wherein an inner section of the first side portion comprises an inward slope; and
  - an aperture disposed in a selected radial position through the inner section of the first side portion, wherein the aperture is oriented toward the first inner wall portion, and wherein the second side portion of the heat shield body is configured to substantially prevent the main cooling flow from entering the outer channel through the second side portion.

13. The vane assembly of claim 12, wherein the outer body portion has a first open end and the inner body portion has an opposing second open end with a reduced cross-section relative to a cross-section of the first open end, the first open end comprising a heat shield inlet and the second open end comprising a heat shield outlet.

14. The vane assembly of claim 12, wherein the selected radial position comprises a radial position proximate a transition to the inward slope of the inner section of the first side portion.

15. The vane assembly of claim 12, wherein the main cooling flow is separated into a first cooling flow that is received by the inner channel and a second cooling flow that is received by the outer channel.

16. The vane assembly of claim 15, wherein the second cooling flow received by the outer channel comprises a minority portion of the main cooling flow.

17. The vane assembly of claim 15, wherein the first cooling flow and the second cooling flow meet downstream of the heat shield body.

* * * * *